United States Patent [19]

Fukuta et al.

[11] Patent Number: 4,703,894

[45] Date of Patent: Nov. 3, 1987

[54] TWO-COMPONENT MIXING TYPE COATING APPARATUS

[75] Inventors: Kenji Fukuta; Matsuo Komiyama; Kazuo Katsuyama; Minoru Tanno, all of Aichi, Japan

[73] Assignees: Toyota Jidosha Kabushiki Kaisha, Toyota; Trinity Industrial Corporation, Tokyo, both of Japan

[21] Appl. No.: 864,479

[22] Filed: May 19, 1986

[30] Foreign Application Priority Data

May 17, 1985 [JP] Japan ................... 64-105702

[51] Int. Cl.<sup>4</sup> ............. F23D 11/46; B05B 7/12; B05B 7/02
[52] U.S. Cl. ............. 239/414; 239/416.2; 239/417.5; 239/525
[58] Field of Search .............. 118/302; 427/426; 239/110, 112, 413, 414, 412, 398, 416.1, 416.2, 417.5, 525

[56] References Cited

U.S. PATENT DOCUMENTS

| 3,073,528 | 1/1963 | Wilson et al. | 118/302 X |
| 4,265,858 | 5/1981 | Crum et al. | 239/112 X |
| 4,529,127 | 7/1985 | Huszagh | 239/112 |
| 4,534,802 | 8/1985 | Gates et al. | 239/112 X |

Primary Examiner—Andres Kashnikow
Assistant Examiner—Patrick N. Burkhart
Attorney, Agent, or Firm—Oblon, Fisher, Spivak, McClelland & Maier

[57] ABSTRACT

A two-component mixing type coating apparatus comprises a supply/mixing device for letting a main component and a hardener run together at an intermediate portion of a supply conduit and sending them to a coating spray gun, check valves disposed in flow portions upstream of a junction in order to prevent backflow from the junction, and stop valves disposed in the flow portions between the check valves and the junction in order to close the flow portions in response to the stop of spray of coating by the coating spray gun.

12 Claims, 5 Drawing Figures

TWO-COMPONENT MIXING TYPE COATING APPARATUS

BACKGROUND OF THE INVENTION

1. Field of the Invention

This invention relates generally to a two-component mixing type coating apparatus suitable for coating car bodies, machine components, and the like, by use of a paint consisting of a mixture of two components, that is, a main component and a hardener, such as a urethane paint.

2. Description of the Related Art

Coating of car bodies, machine components and the like, has been performed in the past by the use of a two-component type coating material. For this coating work, a coating supply apparatus has generally been employed which supplies a main component and a hardener from their supply sources to a coating spray gun 1 by operating respective pumps 2a and 2b as shown in FIG. 4 of the accompanying drawings, runs them together at a junction A in an intermediate portion of the supply conduit, mixes them together in a mixer 3 and supplies the mixture to the spray gun 1. In most cases, a check valve or valves 4a, 4b are disposed in one, or both, of the flow portions upstream of the junction A. During the supply of the main component and the hardener, particularly immediately after stopping the spray operation of the spray gun 1, the main component is likely to enter the flow portion of the hardener from the junction A, or vice versa, due to the difference of supply pressures between the main component and the hardener. The check valves 4a and 4b are provided in order to prevent such a backflow.

Generally, check valves have the following construction. As shown in FIG. 5, for example, a ball valve 6 and a coil spring 7 are held in a valve chamber 8 and a valve seat 9 for the ball valve is formed in such a manner that its diameter decreases gradually on the supply side of the valve chamber 8. There is also disposed a mechanism which pushes the ball valve 6 to the valve seat 9, such as coil spring 7. When no chemical is supplied, the valve is thus kept closed. When the main component or the hardener is supplied, the supply pressure of these chemicals moves the ball valve 6 away from seat 9 against the force of the coil spring 7. When the backflow P comes from the junction A, the pressure of the backflow pushes the ball valve 6 against the valve seat 9 in cooperation with the force of the spring 7, as represented by the dot-chain line in FIG. 5, so that the valve is closed and the backflow P is prevented from further entering the flow portion Q on the side of the supply source.

In accordance with the prior art apparatuses, however, when the coating spray gun 1 is repeatedly operated and stopped and the backflowing main component or hardener repeatedly enters the valve chamber 8 of the check valve, the main component and the hardener are mixed together and cured, and this cured product adheres to the coil spring 7 and the inner walls of the valve chamber 8 and limits the extension and contraction of the coil spring 7; that is, the valve opening and closing operation of the ball valve is deteriorated. As a result, the check valve is permanently retained in the state where it is somewhat open, as shown in solid lines in FIG. 5, and cannot be closed fully. Therefore, the backflow P unavoidably enters the flow portion Q on the supply source side.

SUMMARY OF THE INVENTION

The present invention contemplates providing a two-component mixing type coating apparatus which can reliably check a backflow even when the backflow occurs repeatedly.

The two-component mixing type coating apparatus in accordance with the present invention comprises a supply and mixing device for letting a main component and a hardener run together in a junction at an intermediate portion of a supply conduit and then mixing them together and sending the mixture to a coating spray gun, check valves connected to flow portions upstream of the junction, for checking backflow from the junction, and stop valves connected to the flow portions between the check valves and the junction, for closing the flow portion in accordance with the stop of spray of the coating spray gun.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Hereinafter the present invention will be described in further detail with reference to the accompanying drawings.

Figure 1:
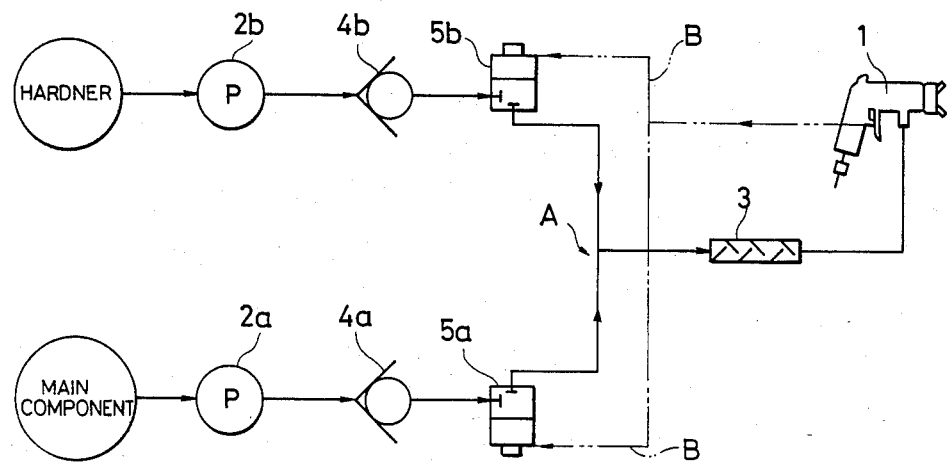
FIG. 1 shows an embodiment of a two-component mixing type coating apparatus in accordance with the present invention.
Figure 4:
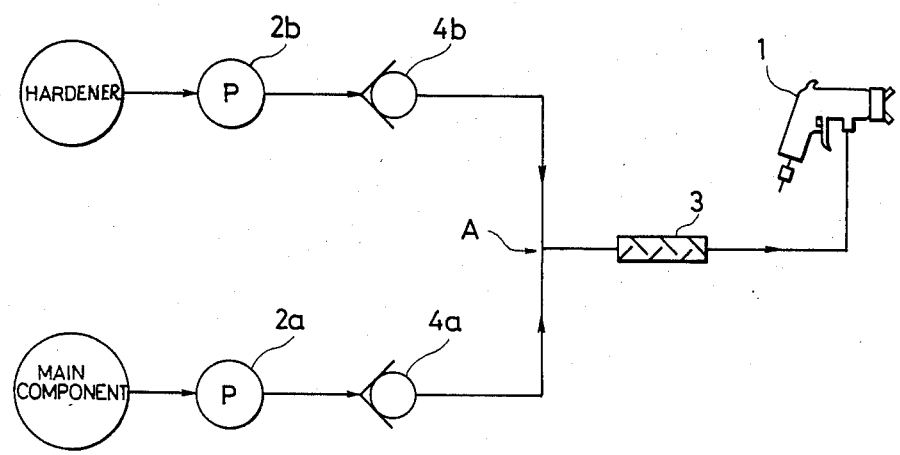
FIG. 4 shows a conventional two-component mixing type coating apparatus.
Figure 5:
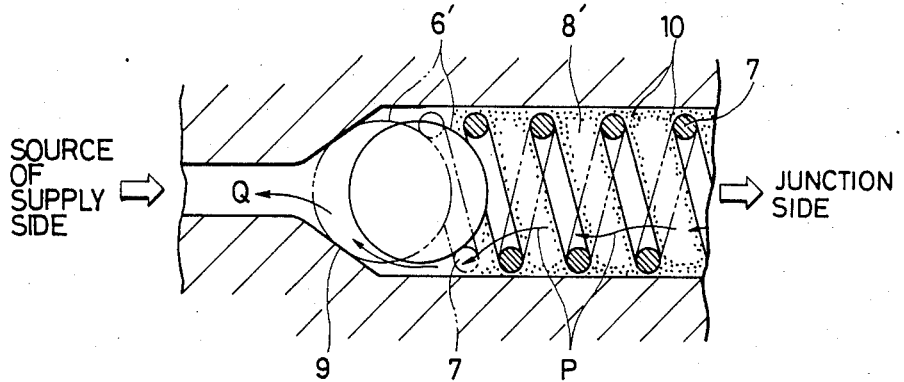
FIG. 5 shows the internal structure of a check valve.

As shown in FIG. 1, a coating apparatus in accordance with the present invention includes stop valves 5a and 5b that are interposed between check valves 4a and 4b and a junction A, respectively. The stop valves 5a and 5b are controlled via circuit B, which may be an electric circuit or a pneumatic circuit, to a coating spray gun 1. When the spray of coating from the gun 1 is stopped during a coating process, a spray stop signal is sent via circuit B from the spray gun 1 to each stop valve 5a and 5b in order to close the valves 5a and 5b and thus to close a supply flow portion. The remainder of the construction is the same as that of the conventional apparatus shown in FIG. 4.

Each stop valve generally has a construction consisting of a needle slidable in a valve chamber, a mechanism which moves the needle in the valve chamber so as to close an inflow port and/or an outflow port connected to the valve chamber, and a member for moving the needle which does not come into direct contact with a fluid when the fluid flows through the valve. Therefore, even if a backflow occurs after the stop of the spray of coating, it is possible to prevent the backflow from flowing up to the check valves by providing the stop valves with a function of maintaining an open state during the spray of coating and of closing the flow portions in response to the stop of the spray of coating by controlling the stop valves in accordance with a signal from the coating spray gun 1.

Moreover, since each stop valve has a construction in which the backflow cannot come into contact with the needle moving member of the valve, adverse influences of a cured product are not exerted upon the needle moving mechanism of the stop valve; that is, the valve opening and closing mechanism operates even when the backflow occurs many times and the cured coating product is formed. Hence, the backflow can always be checked reliably. Because of the stop valve the function of the check valve becomes limited to that of a backflow preventing member that prevents backflow which might otherwise occur during the spraying of a coating.

Various means may be employed for the circuit B of the stop valve to the coating spray gun. For example, it is possible to use an electromagnetic system wherein electric wires are disposed between an electromagnetic solenoid in the stop valve and the coating spray gun; an ON or OFF signal is sent from the gun to the valve when the spray of coating from the gun is stopped, and the needle of the valve is moved by the action of the solenoid in response to this signal so as to close the valve. It is also possible to use an air system wherein a pneumatic conduit arrangement is disposed between a pneumatic stop valve and the coating spray gun; the air pressure is increased or decreased when the spray of coating from the gun is stopped, and the needle of the valve is moved by a moving member in the form of a piston in accordance with this pressure change so as to close the valve.

The electromagnetic system has the advantages that the response sensitivity of the stop valve closing operation is high and the time lag from the stop of the spray of coating by the gun to the closing of the valve is small. In the coating apparatus in accordance with the present invention, however, an electrical system introduces the problem that since the main component, the hardener and a solvent are used, they are likely to be ignited by an electromagnetic opening and closing operation of the stop valve. In contrast, the air system cannot cause a fire by the opening and closing operation of the stop valve and hence is safe.

In order to reduce the supply pressure difference between the main component and the hardener in the coating apparatus of the present invention, it is preferred to increase the diameter of the supply pipe of the main component which has a relatively greater flow rate and to reduce the diameter of the supply pipe of the hardener which has a relatively smaller flow rate.

Since the two-component mixing type coating apparatus of the present invention uses check valves in combination with the stop valves as the backflow prevention means, the apparatus can reliably check backflow not only during the spray of coating but also after the stop of the spray of coating. Therefore, the apparatus of the present invention can secure a smooth and reliable coating operation for an extremely long period of time.

Another embodiment of the present invention will be described with reference to FIG. 2.

Figure 2:
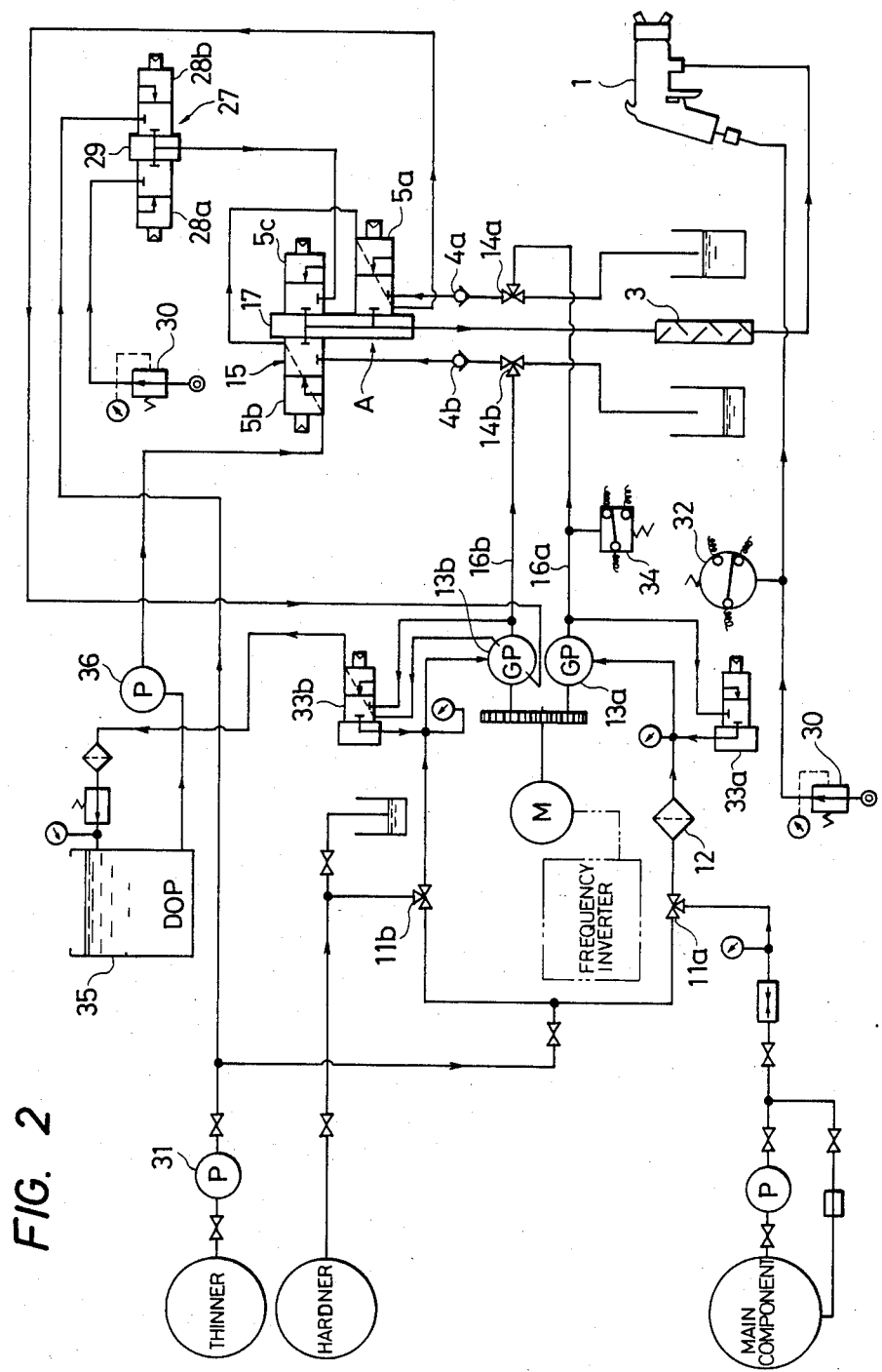
FIG. 2 shows another embodiment of the coating apparatus in accordance with the present invention.

In the coating apparatus shown in FIG. 2, the main component is supplied from its supply source to a gear pump 13a through a three-way cock 11a and a coating filter 12, while the hardener is supplied from its supply source to a gear pump 13b through a thee-way cock 11b. The ratio of the rotational speeds of the gear pumps 13a and 13b is controlled by a motor M and a frequency inverter so that the main component and the hardener are supplied to the coating spray gun 1 from the gear pumps 13a and 13b at predetermined flow ratio such as those in a range from 10:1.5 to 10:2.5. Thereafter, the main component and the hardener agent enter a valve assembly 15 through three-way cocks 14a an 14b and through the check valves 4a, 4b. The main component and hardener join together inside the manifold 17 of the valve assembly 15 (at a junction represented by an arrow A in the drawing), are mixed by the mixer 3 and are thereafter sent to the coating spray gun 1.

In this embodiment, a supply pipe 16a for the main component is a relatively thick pipe having an outer diameter of 8 mm and an inner diameter of 6 mm while a supply pipe 16b for the hardener is a relatively thin pipe having an outer diameter of 6 mm and an inner diameter of 4 mm in order to reduce the supply pressure difference between the main component and the hardener.

The valve assembly 15 includes stop valves 5a, 5b and 5c for the main component, for the hardener agent and for a thinner or air, respectively. The stop valves are arranged to selectively permit flow into the manifold 17.

Figure 3:
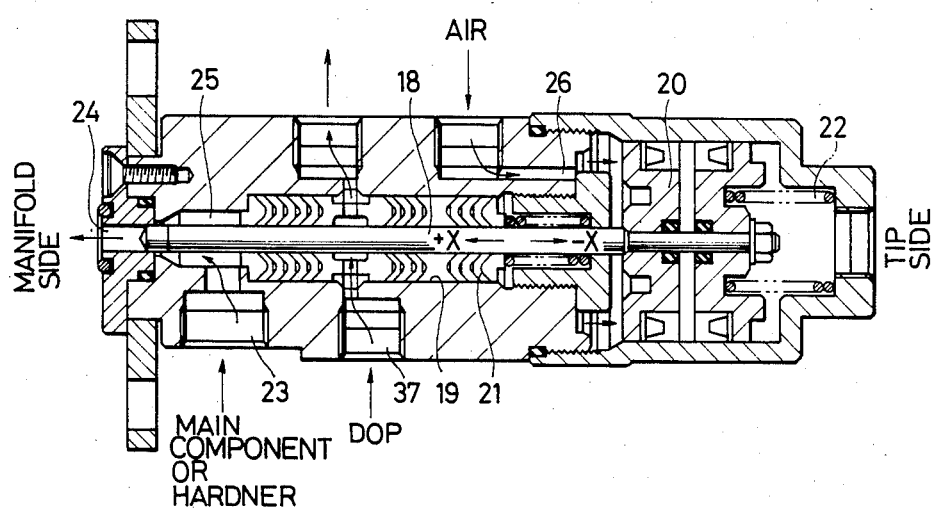
FIG. 3 is a sectional view of a stop valve used in the coating apparatus shown in FIG. 2.

As shown in FIG. 3, each of the stop valves 5a to 5c has a construction in which a needle 18 is movable in a valve chamber 19 and is fixed to, and supported by, a slidable piston 20. A V-packing 21 is fitted to the needle 18 and comes into close contact with the wall of the valve chamber 19, while a spring 22 is interposed between the piston 20 and the valve main body and its spring force urges the needle 18 towards the base end of the stop valve (on the side of the manifold). Each of the valves 5a to 5c has a coating flow path 25 that communicates an inflow port 23 on the base end of the valve with an outflow port 21, and which can be blocked by the needle 18. Each stop valve also has an air flow path 26 that communicates the side portion of the valve with the piston 20.

When an air pressure above a predetermined value acts upon the piston 20 through the air flow path 26, the needle 18 moves towards the tip side (in a direction represented by −X in the drawing) against the force of the spring 22, whereby the stop valve is kept open. When the air pressure drops below the predetermined value, on the other hand, the needle 18 is moved towards the base end by the force of the spring 22 (in a direction represented by +X in the drawing), fits into the outflow port 24 and closes the coating flow path 25. The air flow path 26 of each of the stop valves 5a and 5b is communicated with the inside of the coating spray gun 1 by a pneumatic circuit (shown in Applicant's copending U.S. patent applicaton Ser. No. 864,478 entitled Two-Component Mixing Type Coating Method, which is incorporated by reference) and the air pressure of this pneumatic circuit is reduced simultaneously with the stoppage of the spray of coating by the gun 1. This pressure change is transmitted to the valves 5a and 5b as a spray stop signal and closes them.

In this embodiment, the stop valve 5b for the hardener is disposed at a position upstream of the position of the stop valve 5a for the main component and moreover is in symmetric arrangement with the stop valve 5c for the thinner in such a manner as to face the latter. If the valve 5b for the hardener were to be disposed at a position downstream of the position of the valve 5a for the main component, the flow of the main component having a relatively higher supply pressure would enter the outflow port 24 of the valve 5b for the hardener, be mixed with the hardener and be cured, thereby causing the problem of choking of the pipe. Since the valve 5b for the hardener is disposed in such a manner as to face the valve 5c for the thinner, the flow of thinner enters the outflow port 24 of the valve 5b for the hardener and effectively washes away any hardener adhering thereon.

The stop valve 5c is connected to a valve assembly 27 which consists of a collar valve 28a for air and a collar valve 28b for thinner that are fitted to a manifold 29. The valve 28a is communicated with an air supply source, not shown, through an air regulator 30, while the valve 28b is communicated with a thinner supply source through a pump 31. Since the air and the thinner are both supplied to the coating spray gun 1 through the valve 5c, the manifold 17 and the mixer 3, they clean the supply path from the junction A to the gun 1 and can remove cured coating with the path. The valve assembly 27 is disposed in addition to, and separately from the valve assembly 15 in order to prevent the main component and the hardener from entering the air pipe and checking the air flow.

The paint spray gun 1 is communicated with another air supply source (not shown) through the air regulator 30A and receives the supply of the air for spraying the paint. An air flow switch 32 is disposed in this air path. This switch is responsive to a signal as to whether or not the flow of the coating to the gun exists.

The gear pumps 13a and 13b define circulation paths in cooperation with the collar valves 33a and 33 b respectively, and the collar valves 33a and 33b are controlled by a pressure switch 34 that is in turn connected to the supply pipe 16a for the main component. In a normal operation, the valves 33a and 33b are kept closed but when the supply pressure difference between the main component and the hardener becomes abnormally great, the pressure switch 34 detects the abnormal pressure difference and opens the valve 33a or 33b, whereby the excessive quantity of the main component or hardener is returned to the inflow port of the gear pump 13a or 13b.

In the coating apparatus of this embodiment, a DOP (solvent) flow path is defined in such a manner as to extend from a DOP tank 35 to the pump 36, the stop valves 5a and 5b, the gear pump 13b, the collar valve 33b and back to the DOP tank 35. DOP is caused to flow through this path by the operation of the pump 36 in order to remove any cured product existing therein and to clean each member such as the stop valve 5b. For example, each of the stop valves 5a and 5b have the DOP path 37 extending from one of the side portions of the valve to the other side through the valve inner chamber 19, and the needle 18 can always move smoothly, due to the DOP flow through the DOP path 37, without binding due to a buildup of the main component and the hardener.

When the coating work is to be carried out, a predetermined air pressure is first applied to the coating spray gun 1, and the main component and the hardener are delivered from the gear pumps 13a and 13b, respectively, and are joined together in the valve assembly 15. Thereafter, they are mixed by the mixer 3 and the coating thus prepared is sprayed by operating the trigger of the coating spray gun 1 to coat an object. After the coating work is complete, the air and the thinner are alternately pressure-fed by the stop valve 5c into the supply paths downstream of the junction A so that residual main component and hardener are discharged from this path and choking of the path is prevented.

When the spray of coating is stopped in this coating operation, the stop valves 5a and 5b are closed in response to the stoppage of the spray even if backflow (mostly the flow of the main component entering the path of the hardener) occurs due to the supply pressure difference between the main component and the hardener. Therefore, it is possible to prevent this backflow from flowing past the stop valves 5a, and 5b. Even if the backflow described above occurs on rare occasions at the time of the spray of coating, the check valve 4a or 4b can prevent the backflow. Therefore, even when the coating work is continued for a long period and backflow occurs repeatedly, the apparatus of the present invention can reliably prevent backflow and can always carry out the coating work because no adverse influences due to backflow occur.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A two-component mixing type coating apparatus comprising:
   a first source of a pressurized fluid main coating component;
   a second source of a pressurized fluid coating hardener;
   spray coating dispensing means;
   conduit means connecting said dispensing means with said first and second sources, said conduit means including a main component flow portion connected to said first source, a hardener flow portion connected to said second source, wherein a flow sectional area of said main component flow portion is greater than a flow sectional area of said hardener flow portion, a junction of said main component and hardener flow portions and a combined main component and hardener flow portion extending between said juction and said dispensing means;
   mixing means in said combined flow portion;
   a check valve positioned in each of said main component and hardener flow portions for permitting fluid flow therethrough only towards said junction;
   first and second stop valves respectively positioned in said main component and hardener flow portions at points between a respective one of said check valves and said junction; and
   means for selectively operating said stop valves for stopping fluid flow through said main component and hardener flow portions,
   wherein said junction comprises a flow manifold, wherein said outflow port of each of said stop valves communicates directly with said manifold and wherein said second stop valve communicates with said manifold at a point upstream of said first stop valve in a combined fluid flow direction, whereby backflow of said main component into said hardener flow portion is prevented.

2. The apparatus of claim 1 wherein said means for selectively operating comprise means responsive to the actuation of said dispensing means.

3. The apparatus of claim 1, wherein said stop valves each comprise:
- a valve chamber having inflow and outflow ports communicating with a respective one of said flow portions;
- a needle movable for blocking at least one of said inflow and outflow ports;
- means for moving said needle; and
- means for preventing communication between said means for moving and fluid flowing in said respective one of said flow portions.

4. The apparatus of claim 2, wherein said stop valves each comprise:
- a valve chamber having inflow and outflow ports communicating with a respective one of said flow portions;
- a needle movable for blocking at least one of said inflow and outflow ports;
- means for moving said needle; and
- means for preventing communication between said means for moving and fluid flowing in said respective one of said flow portions.

5. The apparatus of claim 3, wherein said means for selectively operating comprise:
- an electromagnetic solenoid comprising said means for moving; and
- means for supplying electrical energy to said solenoid for moving said needle as a function of the actuation of said dispensing means.

6. The apparatus of claim 3 wherein said means for selectively operating comprise:
- an air pressure sensitive piston comprising said means for moving; and
- means for supplying an air pressure change to said piston for moving said needle as a function of the actuation of said dispensing means.

7. The apparatus of claim 1 including:
- a third source of pressurized fluid thinner;
- a thinner flow portion connecting said third source with said junction; and
- a third stop valve positioned in said thinner flow portion.

8. The apparatus of claim 7 wherein said outflow ports of said second and third stop valves face one another in said manifold.

9. The apparatus of claim 7 including means for introducing pressurized air into said thinner flow portion.

10. The apparatus of claim 7 including means for introducing a solvent into said stop valves.

11. The apparatus of claim 6 including means for introducing pressurized air directly into said dispensing means for dispensing said coating.

12. The apparatus of claim 11 wherein said means for supplying said air pressure change comprise means for detecting a supply of said pressurized air directly into said dispensing means.

* * * * *